Aug. 28, 1962

R. W. CLANTON ETAL 3,050,808

APPARATUS FOR MAKING SHELL BRICK

Filed Oct. 20, 1959

RAYMOND W. CLANTON
ALBERT R. CLANTON
HOLLIS L. CLANTON
INVENTORS

BY

ATTORNEYS

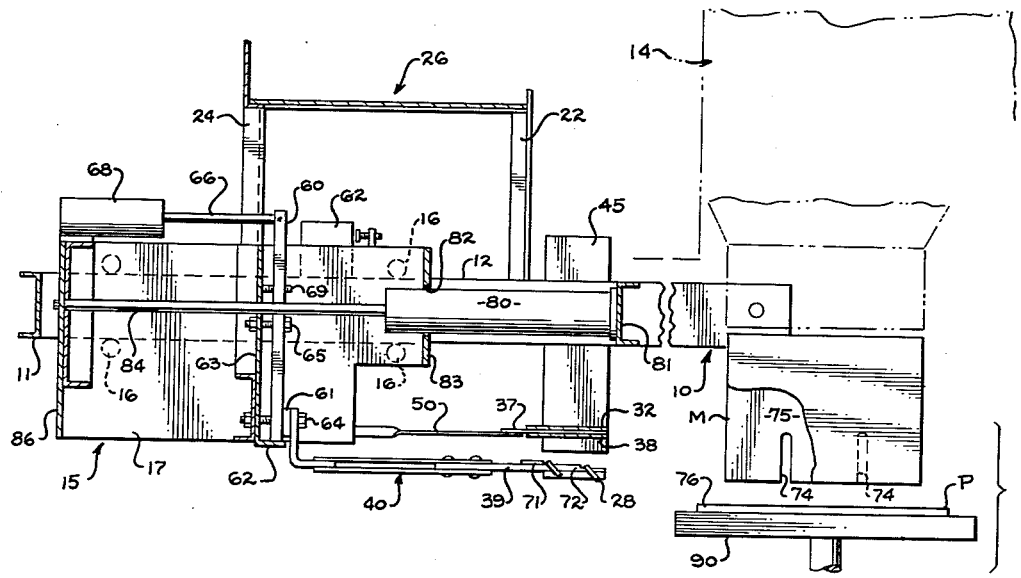
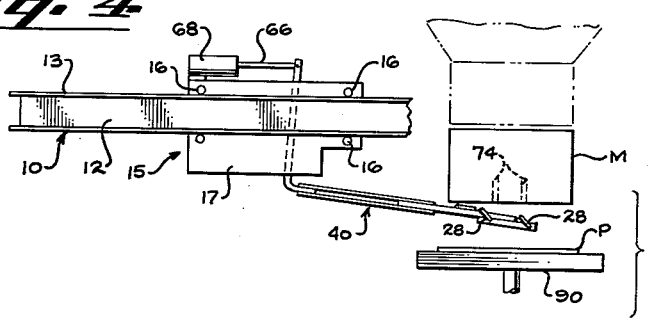
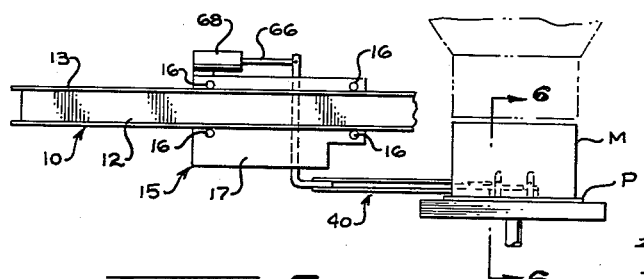

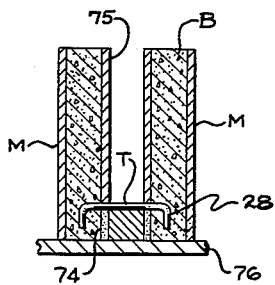
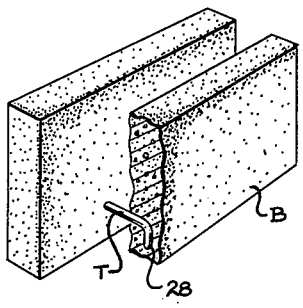
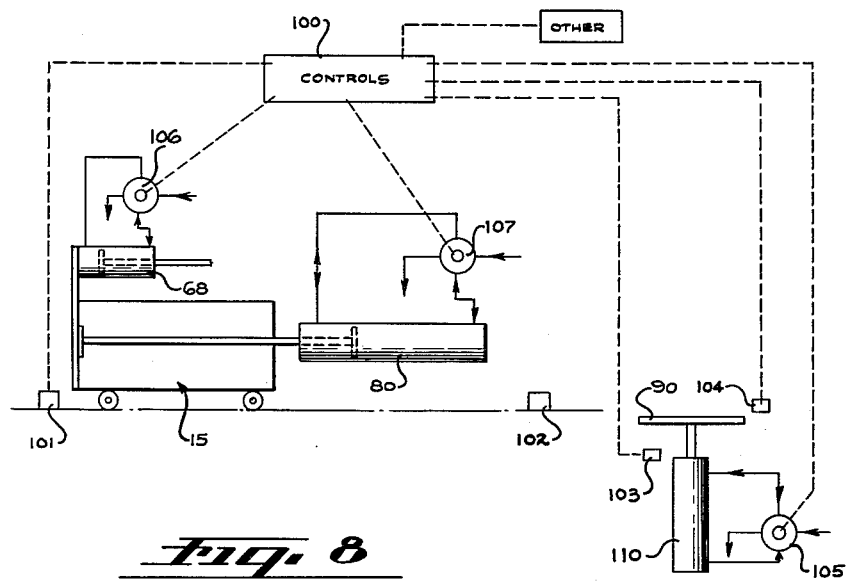
Raymond W. Clanton
Albert R. Clanton
Hollis L. Clanton
INVENTORS

United States Patent Office 3,050,808
Patented Aug. 28, 1962

3,050,808
APPARATUS FOR MAKING SHELL BRICK
Raymond W. Clanton, Sunland, Albert R. Clanton, Pacoima, and Hollis L. Clanton, Sun Valley, Calif., assignors, by mesne assignments, to Kaiser Steel Corporation, Oakland, Calif., a corporation of Nevada
Filed Oct. 20, 1959, Ser. No. 847,482
7 Claims. (Cl. 25—41)

This invention relates to apparatus for making shell brick building units. Such units comprise a pair of parallel, laterally spaced, cast building blocks joined by transverse tie bars having end portions permanently embedded in the blocks.

Variously shaped shell brick have been used in the past, but their fabrication has proved troublesome, particularly in relation to placing the cross ties or tie bars in the mold. Recourse has often been had to manually locating the tie bars in individual block molds. This is undesirable as both costly and time-consuming.

Accordingly it is an object of the present invention to provide molds and cooperating apparatus for automatically forming such shell brick in a substantially continuous process. In particular, it is an object to provide means for synchronously placing metal tie bars in corresponding pairs of molds, then forming therein thus-connected blocks of concrete or other suitable material, removing the formed blocks from the molds and successively repeating the cycle. An important purpose is to provide such a tie bar-positioning unit which can be integrated with existing automatic concrete block making machines.

Another advantage resides in the provision of apparatus of the type indicated which produces a multiplicity of such composite blocks in each cycle, each composite unit or pair being formed with two, embedded, transverse tie bars.

Other objects and advantages of the invention will be apparent from the following description and claims, the novelty consisting in the features of construction, combination of parts, unique relations of the members and the relative proportioning, disposition, and operation thereof, all as more completely outlined herein and particularly pointed out in the appended claims.

In the drawings, which form part of the present specification:

FIG. 3 is an enlarged longitudinal vertical section along the line 3—3 of FIG. 2, with the tie bar-positioning arm in its fully retracted position, many elements being shown in elevation;

FIG. 4 is a fragmentary detail view somewhat diagrammatic in character showing the positioning arms in forward, lowered position prior to entering the spaces between the molds;

FIG. 5 is a view similar to FIG. 4 but showing the positioning arms between the molds and locating the tie bars in the mold;

FIG. 6 is a sectional view on line 6—6 of FIG. 5, but on a larger scale;

FIG. 7 is an isometric view of a completed shell brick unit, partially broken away; and FIG. 8 is a schematic view of the hydraulic elements and electrical control means.

In general, our invention provides shell brick molds M wherein the opposing inner vertical walls of a pair are provided with transversely aligned, vertical slots 74 extending a limited distance up from the bottom for insertion of the tie bars T. A vertically movable pallet P forms the mold floor, and while it is lowered, longitudinal positioning arms 40 insert the tie bars upward in the slots, continuing to hold them in place while the pallet comes up and the mold is filled from above. The arms are subsequently longitudinally withdrawn.

Figure 1:
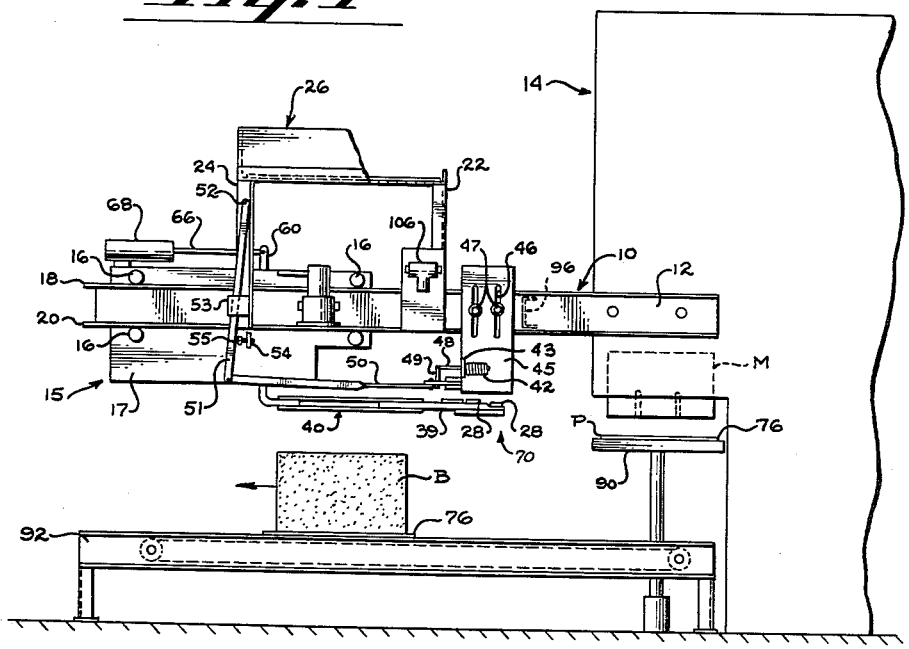
FIG. 1 is a side elevational view of our tie-bar positioning device with the carriage seen in retracted or tie-bar reloading position adjacent a block molding machine and with lower, conveyor means for withdrawing formed shell brick from the vertically movable, pallet support.
Figure 2:
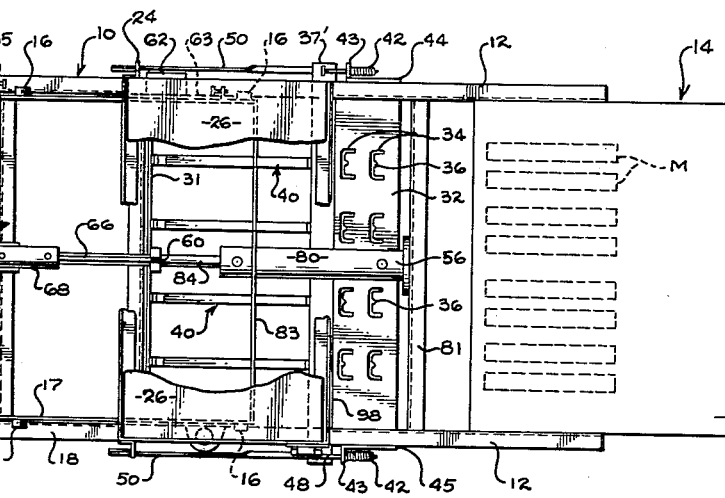
FIG. 2 is a top plan view of the device with the position of pairs of shell brick molds within the molding machine indicated in broken lines.

As shown in FIGS. 1–2, there is provided a generally U-shaped, stationary, horizontal frame 10 of channel-shaped steel members spaced vertically from the floor or other supporting surface and including a rear cross member 11 and a pair of side members 12, the end portions of which embrace a conventional, automatic, concrete block molding machine 14, members 12 being bolted or otherwise secured thereto. A substantially horizontally disposed carriage 15 is supported across the frame upon rollers 16 so as to be reciprocably movable toward and away from the machine 14. The rollers are mounted in vertically spaced pairs on side plates 17 disposed adjacent the inner face of each frame member 12, with the rollers thus held in registration respectively with the top and bottom surfaces of the upper 18 and lower 20 portions of members 12.

Extending upward from the frame 10 and supported by pairs of front and rear corner posts 22, 24 is a bin or open top receptacle 26 in which a supply of U-shaped tie bars 28 are loosely stored. Spaced below and in front of the bin in the direction of the machine 14 is a stationary, horizontal tie bar-receiving plate 32 (FIG. 2) supported across the frame 10 and formed with four pairs of U-slots 34. The slots of each pair are spaced apart in the direction of movement of the carriage while the pairs are spaced transversely relative to corresponding pairs of molds M in the machine 14. Each slot 34, in addition to its general U-shape which corresponds to a tie bar 28, is formed with a short, medial slot 36 for reception of the operator's thumb or finger for ease in manually placing a single tie bar in each slot. The thickness of the slotted plate 32 corresponds roughly to the thickness of one tie bar, and immediately below the plate 32 is a slide plate 37 (FIG. 3), below which in turn, is a delivery plate 38 apertured for respective tie bars to drop through each time the intermediate slide plate 37 is retracted from beneath the tie bar-receiving plate.

As will be more evident upon subsequent description, each pair of tie bars which thus drop down are received upon a magnetized tongue 39 of a longitudinally reciprocable, positioning arm 40 when it is disposed therebelow. Coil springs 42 are individually secured to opposing outer faces of the frame elements 12 by outturned attachment ears 43 of vertically adjustable bracket plates 45 having slots 46 for mounting screws 47 which thread into the adjacent elements 12. An axial shaft 48 is secured at one end to the free end of each coil spring and extends therethrough and through the apertured ear 43, being secured at its other end to a vertical post 49 of a flat, lateral extension 37' of the slide plate 37. The latter is connected adjacent each end to an outer, generally horizontal pair of links 50. Each link is pivotally secured to an upright lever 51 (FIG. 1) which in turn is pivoted at its upper end 52 to the stationary support 24, being restrained against outward displacement by a short vertical guard tab 53.

An outwardly projecting, adjustable contact head (FIG. 1) consisting essentially of a tapped ear 54 and a headed screw 55 mounted therein is disposed on the outer face of each vertical side plate 17 so that the heads engage the lower portions of the levers 51, respectively, and thus cause the links 50 to retract the slide plate 37 as the carriage 15 moves back from the machine 14. The end of each positioning arm 40, being then disposed directly beneath delivery plate 38, a set of tie bars 28 drops down thereon. Upon the subsequent forward movement of the carriage 15, the slide 37 is retracted by springs 42 and the operator places another set of tie bars in the slots 34.

Within the carriage 15 is an upright lever 60 which has a transverse member 61 fixedly secured to it at its lower end. The latter rests upon a ledge or footing member 62. The members 60 and 61 are loosely connected to a wall 63 of the carriage by a series of loosely mounted bolts 64 extending through member 61 and a loosely mounted bolt 65 extending through member 60. The upper end of member 60 is pivotally connected to the piston rod 66 of a piston within a cylinder 68 stationarily mounted on the carriage. It will be apparent that the member 60 can be pivoted forwardly and backwardly in a vertical plane to a limited extent with the ledge or footing 62 acting as the pivotal point. A set screw 69 is provided in member 60 for adjustably limiting the amount of such movement.

The aforementioned forwardly extending tie bar-positioning arms 40 are rigidly attached at one end to member 61 in laterally spaced relation so that the arms will be in alignment with the spaces between pairs of molds. Each arm, at its free end, has a magnetized stepped tongue section 39 providing shoulders 71 and 72 for locating a pair of tie bars as they are delivered to the tongue through aligned openings of the apertured delivery plate 38 thereabove. It will be seen that when the upright arm 60 is held vertically, the magnetic tongues 39 of the several arms 40 are substantially horizontally aligned transversely beneath the tie bar delivery plate 38. When the piston rod 66 moves outward (to the right in FIG. 1) each tie bar-carrying tongue 39 tilts downwardly, and, as will later appear, forward movement of the carriage occurs with the tongues thus depressed. When the latter are then located beneath the molds M, with the areas occupied by the tie bars nearly in vertical alignment with vertical slots 74 in the inner wall 75 of each mold, lifting of the tongues inserts a tie bar 28 in each transversely aligned pair of mold slots. After raising of the pallet 76 on the pallet elevator 90 and filling of the molds with concrete, the positioning arms are retracted horizontally, withdrawing the tongue sections 39 to a reloading position beneath the tie bar delivery plate 38, by retraction of the carriage 15.

The carriage 15 is moved by a horizontally disposed cylinder 80 having one end fixedly secured to a forward cross member 81 of the frame 10, the cylinder body being freely received in a central aperture 82 of the front cross wall 83 of the carriage. A piston rod 84, projecting from the cylinder is attached to the rear cross wall 86 of the carriage.

The machine 14 may be any conventional concrete block molding machine of the type wherein the molds M are open at the top and bottom, being adapted to be filled from the top and, during the filling and molding operations, closed at the bottom, by a pallet P which is supported upon a vertically movable elevator 90. It is contemplated that the fluid operable components of the mechanism heretofore described can be controlled by a conventional fluid supply and control means including solenoid-operated valves and suitable limit switches associated with the carriage 15. It is also contemplated that the control means and fluid or hydraulic means of the carriage to be tied into and correlated with that of the machine 14 so that the movement of the carriage and the positioning arms 40 carried thereby are related and synchronized with the movements of the associated parts of the machine 14. However, since such control systems can be readily worked out by one skilled in the art it is thought unnecessary to disclose the details of such a system, and, consequently, in FIG. 8 we only show quite generally a schematic view of such a system designated to correlate and show the interrelation of the tie bar-positioning means with certain parts of the block molding machine.

Referring now to FIG. 8, numeral 100 designates an electronic and electric control center or means for receiving signals from limit switches 101 and 102 operable by the carriage 15, limit switches 103 and 104 operable by the elevator 90 and others (not shown) as well as being responsive to certain manual controls (not shown). The control center is shown electrically connected for controlling solenoid type valves 105, 106 and 107 controlling the fluid lines to the cylinder 110 operating the elevator, the cylinder 68 operating the tie bar-positioning arms, and the cylinder 80 operating the carriage, respectively. By such a means as illustrated, the carriage and tie bar-positioning arms can be operated in combination, and timed relation with each other, with the elevator, and other components of the block molding machine. Arrows on the fluid lines indicate the direction of flow. Any suitable source of pressure fluid can be utilized to supply the valves.

In the operation of the apparatus, with the parts in the position shown in FIG. 3 wherein the elevator is raised and the pallet is shown forming a floor for the various molds and the positioning arms 40 are shown retracted and raised for reception of a new supply of tie bars thereon, after the particular blocks in the molds have been completed the elevator 90 lowers to deposit the pallet P and blocks B on the conveyer 92 for removal. A new pallet is then placed upon the elevator and while the elevator is in lowered position the carriage and its positioning arms 40 advance with the arms lowered as shown in FIG. 4. The tie bars T upon the ends of the arms are then substantially aligned with the slots 74 in the molds and, after the carriage is fully extended the arms are raised to place the tie bars in the molds as shown in FIG. 5. Subsequently, or as the tie bars are entering the spaces between the molds, the elevator rises and lifts the new pallet to act as a floor for the molds. It will be noted in this connection that the dimension such as the width of the ends of the individual positioning arms 40 is such that the arms substantially fill the spaces between molds in the region of the slots 74 and thereby prevent loss of material through the slots during the subsequent filling, jarring and compressing of the concrete in the molds. The molds are then filled by the machine 14 and the concrete rammed and vibrated. Before the molding operation is completed the carriage retracts carrying the positioning arms 40 to the reloading position of FIG. 3. Thus, during at least a portion of the block molding operation, a loss of material through the slots 74 is prevented. While the carriage and arms are retracted, the elevator lowers to deposit the pallet and its load of formed blocks B on a conveyer 92 for removal of the blocks, completing the cycle.

In FIG. 7 we show a completed shell brick unit comprised of two blocks B connected by the tie bars T.

Although we have illustrated and described a preferred form of our invention, we contemplate that various changes and modifications can be made therein without departing from the invention, the scope of which is indicated by the following claims.

For example, although we have shown and described the apparatus specifically for use in inserting tie bars in shell brick, we contemplate that the apparatus may also be used for inserting other types of articles in molds such as might be required for other articles and, in the claims which follow, the term "tie bars" is not intended in a limited sense.

We claim:

1. In apparatus for making a laterally spaced pair of molded blocks connected by at least one transverse tie bar having its ends embedded in the individual blocks of the pair, said apparatus including a pair of spaced vertical molds with each mold having at least one vertical slot on the inner wall thereof adapted to receive the end of a tie bar raised upwardly from below said molds, means for inserting the ends of a tie bar in the vertical slots of said pair of molds and for supporting said tie bar in a mold inserted position during at least a portion of the block molding operation and for preventing a loss of material through said slots during at least a portion of the block molding operation, said means comprising a frame, a carriage mounted on said frame for horizontal movement toward and away from said molds, a tie bar positioning arm pivotally mounted on said carriage and having a free end portion projecting towards the vertical space between said molds, said free end portion of said tie bar positioning arm being adapted to loosely support at least one tie bar thereon, means on said carriage for pivoting said arm, means for moving said carriage and said arm toward said vertical molds in such a fashion that the free end portion of said arm is brought below said vertical slots and in registry with the space therebetween, means for actuating said arm pivoting means in such a fashion as to first raise the free end portion of said arm into said space between said molds whereby at least one tie bar on said free end portion of said arm is inserted in position in the slots of said molds and then to hold said arm in a raised position while the free end portion thereof supports said tie bar in position during at least a portion of the molding operation, said free end portion of said arm being of such a dimension as to substantially fill the space between said molds in the region of said slots to prevent loss of material through said slots during at least a portion of the block molding operation.

2. Apparatus as set forth in claim 1 wherein said free end portion of the tie bar positioning arm is provided with a magnetized supporting surface.

3. Tie bar-placing means adapted for use in conjunction with a block-molding machine for making laterally spaced pairs of molded blocks connected by at least one transverse tie bar having its opposite ends embedded in individual blocks of the pair, comprising a supporting frame, a reciprocable carriage movable on said frame toward and away from said machine, at least one longitudinal arm movably mounted on said carriage and projecting toward said machine, said longitudinal arm having its free end provided with a magnetized supporting surface for holding at least one metallic tie bar transversely and loosely disposed thereon, a lever arm carried by said reciprocable carriage and connected to the other end of said longitudinal arm and adapted to move said tie bar-carrying end of said arm vertically to a position between laterally slotted molds of blocks disposed in said block-molding machine which are adapted jointly to receive such tie bar thereacross within said machine when said carriage is in a forward position, operating means for reciprocable movement of said carriage and for vertical movement of said lever and longitudinal arm, and additional means on the frame for placing successive tie bars on said magnetized surface when said carriage and longitudinal arm are retracted, said last-mentioned means including a positioning plate disposed above the magnetized surface of said longitudinal arm when said arm is in the retracted position, said positioning plate having slots for reception of individual tie bars, and a slide plate disposed therebeneath so as to allow, upon retraction, said tie bars to drop onto and be held by the magnetized surface of the arm.

4. A tie bar-placing means adapted for use in conjunction with a block molding machine for making laterally spaced pairs of molded blocks connected by at least one transverse tie bar having its opposite ends embedded in individual blocks of the pair, comprising a supporting frame, a reciprocable carriage movable on said frame toward and away from said machine, a longitudinal arm movably mounted on and projecting outwardly from said carriage and extending toward said machine, said arm having its free end provided with a magnetized supporting surface for loosely holding at least one bar transversely disposed thereon, an upright disposed, lever arm carried by said reciprocable carriage with its lower end fulcrumed thereon and fixedly connected to the proximate end of said longitudinal arm, and its upper end coupled to a longitudinally reciprocable operating rod by means of which the tie bar-carrying end of said arm may be moved vertically between adjacent, upwardly slotted side walls of block molds of said machine so as to place a transverse tie bar jointly in the slots of adjacent molds when said carriage is in a forward position, and after joint retraction of the longitudinal arm and carriage to a tie bar-reloading position, said end may be dropped for successive forward movement of the carriage, metering means on the frame for placing successive tie bars on the tie bar-receiving surface when said carriage and longitudinal arm are retracted, said metering means including a positioning die having a slot for reception of each individual tie bar, and a slide plate, disposed therebeneath so as to allow upon retraction tie bars to drop down onto the magnetized surface of the longitudinal arm located therebelow, and operating means for moving said carriage forward, raising said longitudinal arm to a tie bar-locating position in relation to a pair of slotted molds, then retracting the carriage and raised arm to a tie bar-loading position beneath said slide plate, displacing said slide plate to allow each tie bar to drop from a die to the tie bar-receiving surface, and then dropping the arm for a subsequent forward movement.

5. Apparatus as set forth in claim 1 wherein said free end portion of the tie bar-positioning arm is provided with stepped shoulder means for receiving a plurality of tie bars.

6. Apparatus as set forth in claim 2 wherein said magnetized supporting surface is stepped so as to receive a plurality of tie bars.

7. Apparatus as set forth in claim 4 wherein said magnetized supporting surface is provided with stepped portions for receiving a plurality of tie bars.

References Cited in the file of this patent

UNITED STATES PATENTS

| | | |
|---|---|---|
| 2,492,415 | Coates et al. | Dec. 27, 1949 |
| 2,583,597 | Ryner | Jan. 29, 1952 |
| 2,614,308 | Burkard | Oct. 21, 1952 |
| 2,916,793 | Ellis et al. | Dec. 15, 1959 |